United States Patent [19]

Greener

[11] Patent Number: 4,662,511
[45] Date of Patent: May 5, 1987

[54] PALLET TRACK WITH SPEED RETARDER

[76] Inventor: Richard C. Greener, P.O. Box 657, Lancaster, Pa. 17604

[21] Appl. No.: 645,786
[22] Filed: Aug. 30, 1984
[51] Int. Cl.$^4$ .................. B65G 23/06; B65G 23/04; B65G 11/00; B65G 23/00
[52] U.S. Cl. .................. 198/834; 198/835; 198/855; 193/2 D
[58] Field of Search ............ 198/834, 835, 855; 193/2 D; 14/70

[56] References Cited

U.S. PATENT DOCUMENTS

| 595,522 | 12/1897 | Chambers | 193/2 D |
| 964,079 | 7/1910 | Winkler | 14/70 X |
| 1,026,617 | 5/1912 | Turnbull | 198/834 |
| 2,421,056 | 12/1943 | Dake et al. | 193/2 D |
| 3,289,817 | 12/1966 | McLaughlin | 198/835 |

FOREIGN PATENT DOCUMENTS 635849 8/1963 Belgium .................. 198/835

Primary Examiner—Andres Kashnikow
Assistant Examiner—Patrick N. Burkhart
Attorney, Agent, or Firm—Harvey B. Jacobson

[57] ABSTRACT

A pallet track for supporting a plurality of pallets for gravity movement along an inclined path with the pallet tracks including a speed retarder or brake associated with an endless chain conveyor assembly having an upper flight supportingly engaging the under surface of a pallet. The conveyor assembly chains are constructed with a plurality of pivotally interconnected components with each of the components including offset mating edge portions receiving a pivot pin which also serves as an axle for a roller which has a periphery depending below the inner surfaces or edges of the chain for supporting engagement with a backing rail or track and also for engagement in peripheral notches in end sprocket wheels. A plurality of the pallet tracks are arranged in longitudinal alignment to form the inclined path with a conveyor chain being disposed in underlying relation to each end portion of the pallet generally in alignment with the pallet stringers. The upper surface of each of the conveyor chains defines a substantially smooth and continuous supporting surface for engagement with the pallet substantially throughout the length of the pallet.

2 Claims, 6 Drawing Figures

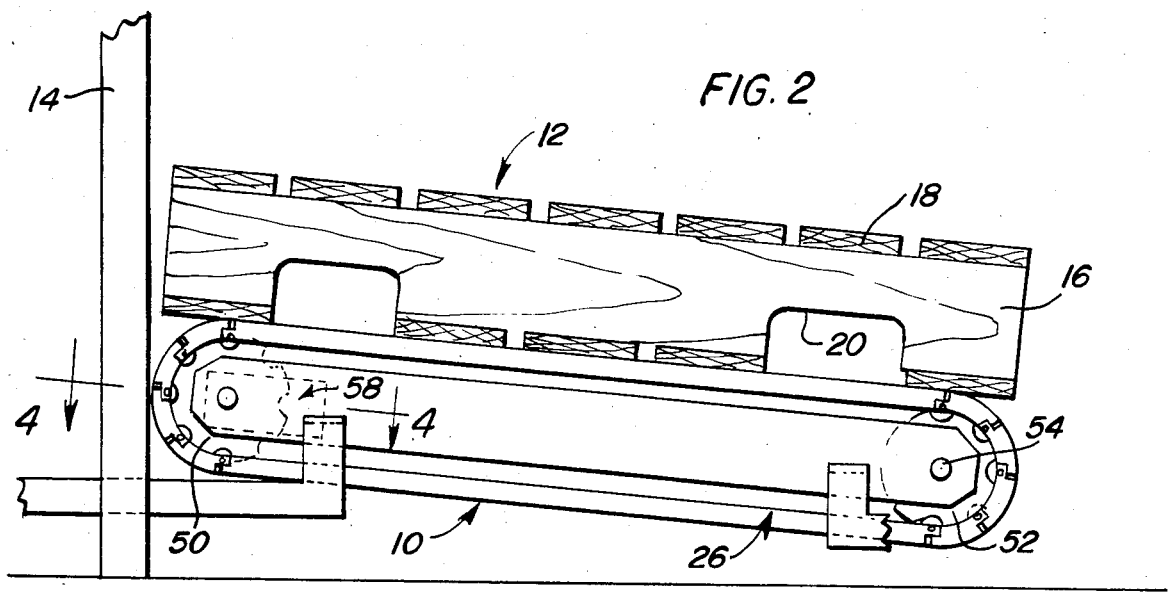
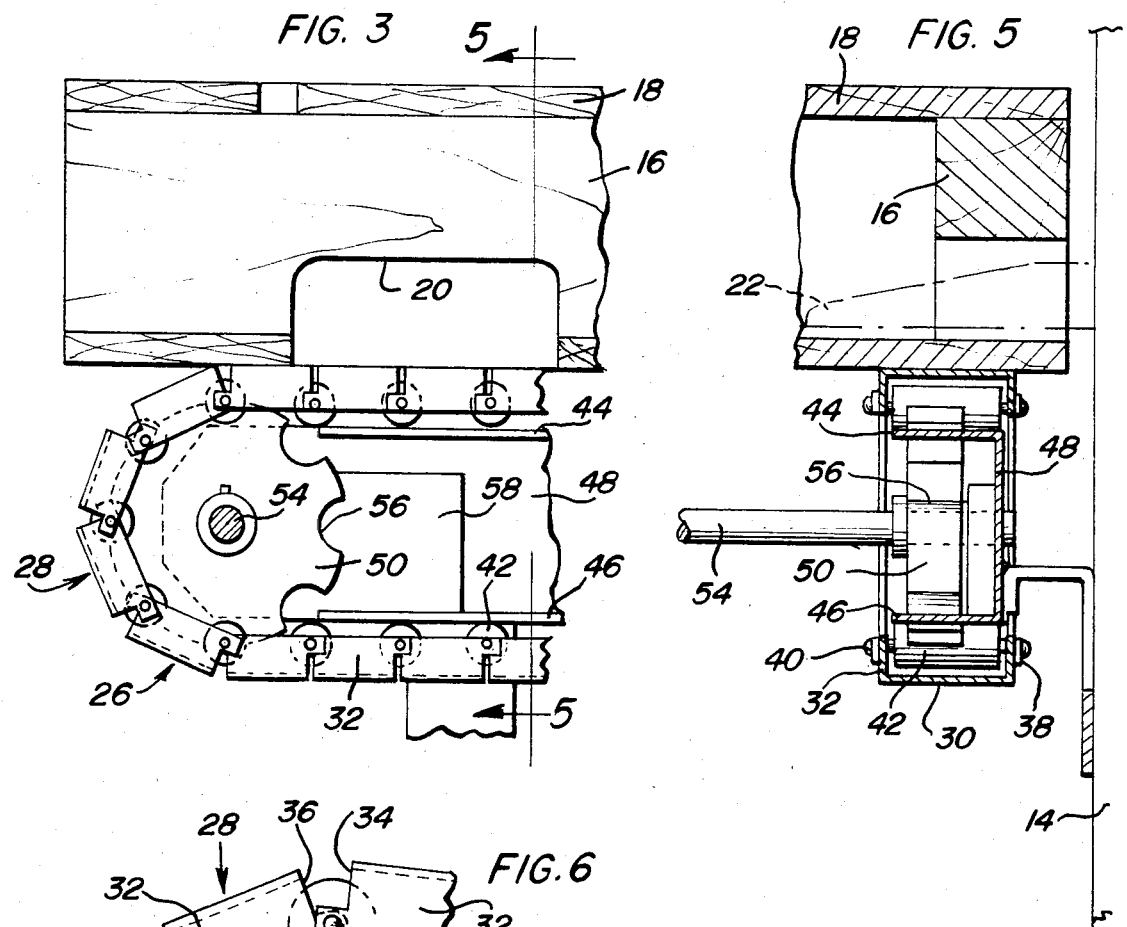
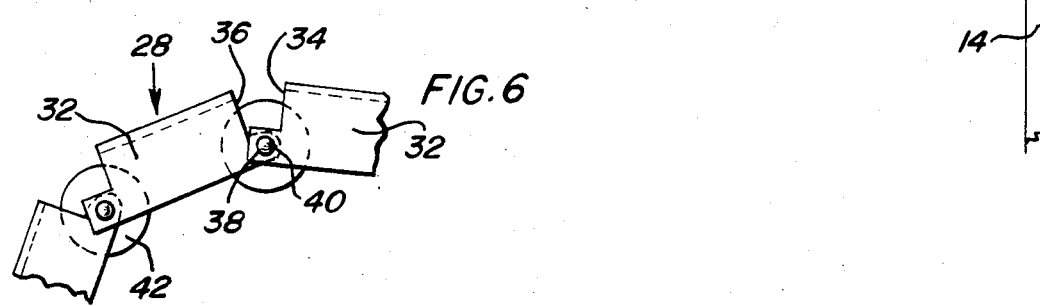

PALLET TRACK WITH SPEED RETARDER

BACKGROUND OF THE INVENTION

1. Field of the Invention

The present invention generally relates to a structure utilized to support a plurality of pallets for movement along an inclined path due to the force of gravity and more particularly to a structure for controlling and retarding movement of the pallets and providing an effective support for the pallets during their movement with the path including a plurality of sections each of which is independently controlled by a speed retarding mechanism.

2. Description of the Prior Art

Various types of conveyor structures in which the conveyor is provided with a backing rail to support the load carrying flight of the conveyor are well known and various types of brake mechanisms associated with conveying apparatuses are also generally known as exemplified by the following U.S. patents:

U.S. Pat. No. 1,718,443, June 25, 1929
U.S. Pat. No. 3,034,638, May 15, 1962
U.S. Pat. No. 3,273,726, Sept. 20, 1966
U.S. Pat. No. 3,627,092, Dec. 14, 1971
U.S. Pat. No. 3,808,921, May 7, 1971
U.S. Pat. No. 3,934,712, Jan. 27, 1976
U.S. Pat. No. 4,179,025, Feb. 18, 1979
U.S. Pat. No. 4,274,536, June 23, 1981
U.S. Pat. No. 4,383,598, May 17, 1983
U.S. Pat. No. Re. 30,706, Aug. 11, 1981.

SUMMARY OF THE INVENTION

An object of the present invention is to provide a pallet track supporting one or more pallets for gravity movement along an inclined path under controlled speed conditions in which the pallet track includes conveyor chains underlying and supporting a pallet generally in alignment with the pallet stringers with the pallet track presenting a substantially flat supporting surface to the under surface of the pallet and a supporting backing rail for supporting the upper load bearing flight of the conveyor chains with the conveyor chains each being constructed of a plurality of rigid, pivotally interconnected elements in which the pivot axis is offset from the adjacent end surfaces of the connected elements and oriented in vertically spaced relation to the load supporting surface of the conveyor elements.

Another object of the invention is to provide a pallet track in accordance with the preceding object in which the pivotal connection between adjacent elements includes a pivot pin or axle which extends between and interconnects the generally channel-shaped elements with a roller being mounted on the pin or axle with the periphery thereof extending inwardly beyond the inner edge of the conveyor elements for supporting and rolling engagement with the backing rail.

A further object of the invention is to provide a pallet track in accordance with the preceding objects in which the conveyor elements each have a projecting end portion and a recess along the inner surface thereof providing an offset connection between adjacent elements with the offset being spaced from the abutting edges of the conveying elements when the conveying elements are in a straight line position.

Still another object of the invention is to provide a pallet track arrangement in accordance with the preceding objects in which the conveyor chains encircle end sprockets with the end sprockets including notches engaging the rollers rather than the conveyor elements with the conveyor chains at opposite sides of the pallet being interconnected by a shaft and a speed retarding mechanism is connected to the sprocket or shaft in a manner to limit the rotational speed of the upper end sprocket thereby controlling the speed of the conveyor chains and maintaining the upper flight of the conveyor chain under tension as the conveyor chains are driven by movement of a pallet by gravity down an inclined path.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged elevational view of one of the pallet tracks and conveyor chains forming a part thereof with the pallet supported thereon.

FIG. 3 is an enlarged side elevational view of one end portion of a conveyor chain with the interconnecting shaft and supporting backing rail being shown.

FIG. 5 is a detailed vertical sectonal view taken substantially upon a plane passing along section line 5—5 on FIG. 3.

FIG. 6 is an enlarged fragmental elevational view showing the connection between adjacent elements of the conveyor chain.

DESCRIPTION OF THE PREFERRED EMBODIMENT

Figure 1:
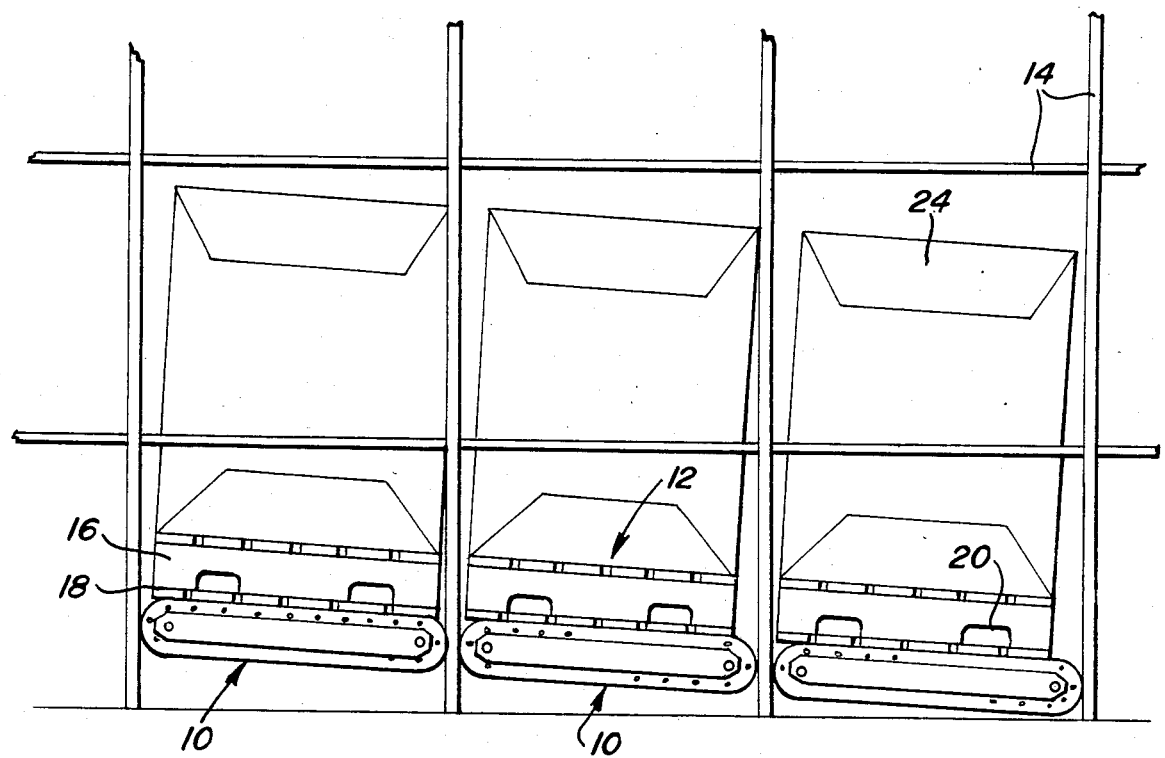
FIG. 1 is a schematic side elevational view illustrating the pallet track of the present invention supporting a plurality of loaded pallets for movement down an inclined path.
Figure 4:
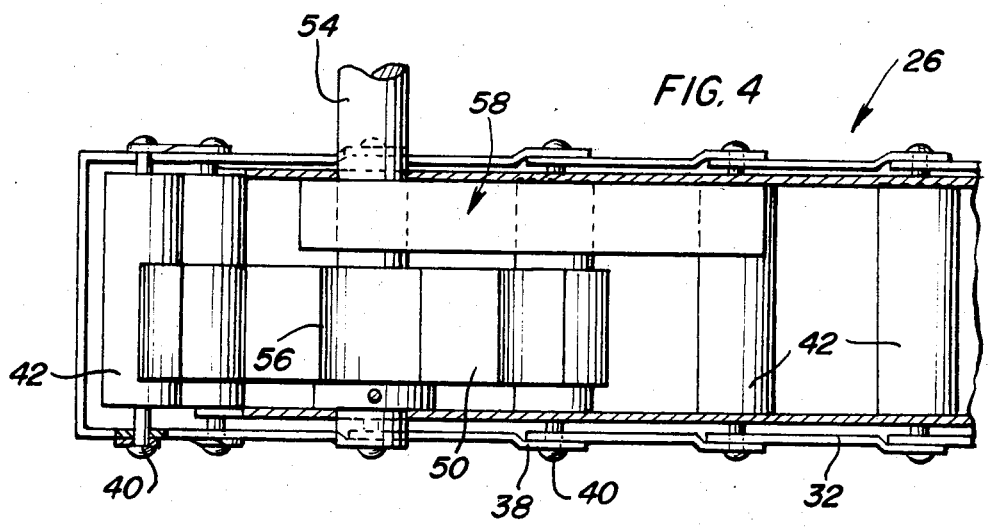
FIG. 4 is a detailed plan sectional view taken substantially upon a plane passing along section line 4—4 on FIG. 2 illustrating structural details of the conveyor chain.

Referring now specifically to the drawings, the pallet track of the present invention is generally designated by the numeral 10 and is used to support a plurality of pallets 12 for movement by gravity down an inclined path with the pallet tracks being supported by vertical and horizontal framework components 14. The pallet track of the present invention is used as part of the system disclosed in co-pending application, Ser. No. 611,352, filed Mar. 15, 1984, for STORAGE, ORDER AND REPLENISHING SYSTEM, the disclosure of which is incorporated herein by reference thereto.

The pallet 12 is of conventional configuration and includes longitudinal stringers 16 and transverse top and bottom boards or strips 18 secured to the stringers 16 in spaced relation by conventional fasteners in a conventional manner. The pallet 12 also includes a notch or slot 20 formed in the stringers 16 to enable 4-way entry of the forks of a lift truck designated by numeral 22 or if only 2-way is desired, the notches 20 do not exist. A load of any desired material or items 24 is positioned on each of the pallets 12. The pallet tracks 10 each include a pair of conveyor chains 26 which are in transverse alignment and the pallet tracks are in longitudinal alignment and oriented to define an inclined path of movement for the pallets 12 with the load 24 thereon being moved by gravity along the plane defined by the upper flights of the conveyor chains 26. Each of the conveyor chains 26 are positioned to supportingly engage the pallet generally in underlying relation to the stringers 16 which may be at the outer ends of the top and bottom boards or spaced inwardly therefrom. Each conveyor chain 26 includes a plurality of channel-shaped conveyor elements 28 which include an outer web 30 and a pair of inwardly extending flanges or legs 32 preferably of one-piece construction. One end of each channel-shaped element 28 is provided with a flat end edge 34 and the opposite end edge 36 of the U-shaped element 28 is provided with a projecting tab 38 at the inner portion of the edge 36 on each of the flanges 32 for overlapping the corresponding inner corner of the adjacent flanges 32 with a pivot pin or axle 40 extending through the projecting tabs 38 and the overlapped inner corner portion of the flanges 32 as illustrated in FIG. 6. When the U-shaped members 28 are in alignment with each other, the edges 34 and 36 are generally parallel to each other and rather closely spaced to provide a substantially continuous and flat load supporting surface on the conveyor chains 26 which are in supporting engagement with the pallet 12.

A cylindrical roller 42 is mounted on each of the pivot pins or axles 40 and is disposed between the flanges 32 with a portion of the periphery thereof extending inwardly beyond the inner edges of the flanges 32 as illustrated in FIG. 6 and also in FIGS. 3 and 5. The inner periphery of the rollers 40 are in supporting engagement with backing rails 44 and 46 which are interconnected by a side rail 48 so that both the upper and lower flights of the conveyor chains 26 will be maintained in substantially straight condition with the inclination of the pallet tracks being such that a substantially continuous inclined path of movement is provided for enabling the pallets 12 to move down the path of movement by gravity from one pallet track to the next until the pallet reaches its lowest point or its unloading station.

Each conveyor chain 26 also includes a pair of end sprockets 50 and 52 each of which are mounted on an interconnecting shaft 54 so that the conveyor chains 26 at each side of the pallet forming the pallet tracks will move in unison. The sprockets 50 and 52 include peripheral semi-circular notches 56 which engage with the rollers 42 as illustrated in FIGS. 3 and 5 so that a positive interengagement exists between the sprocket gears 50 and 52 and the conveyor rollers 42. A predetermined number of notches 56 are provided in the sprockets to engage a plurality of the rollers from the top to the bottom periphery of the sprockets as illustrated in FIG. 3. Thus, the gravity movement of the pallets down the inclined path will cause the conveyor chains 26 to be driven by virtue of the frictional engagement of the lower surface of the pallets with the upper surface of the upper load bearing flight of the conveyor chains 26 which also causes the sprockets 50 and 52 to rotate at a predetermined speed dependent upon the gravitational movement of the pallets. The conveyor chains 26 include a speed retarder generally designated by numeral 58 which is rigidly connected with the side rail 48 and connected to the shaft 54 to which the uppermost sprocket 50 is attached so that the shaft 54 and sprockets 50 will be retarded to control the speed of movement of the pallets 12 and thus maintain the upper flight of the conveyor chains 26 in tension thus controlling the speed of downward movement of the pallets along the inclined path of movement defined by the pallet tracks 10.

The structure of the speed retarder or controller 58 is in and of itself a known component which uses centrifugal braking action to control the rotational speed of the shaft 54 and the sprockets 50. Only one speed controller is required per pallet track and it is associated with the uppermost sprockets to retain the upper flight of the conveyor chains 26 under tension. The speed retarder mechanism is mounted within a dust-tight housing to maintain prolonged useful life of the speed retarder.

The conveyor chain links or elements 28 are preferably constructed of formed steel or other material and the supporting wheel or roller may be a cylindrical continuous roller or spaced steel wheels and provided with suitable bearings to reduce friction load. While the pallet tracks are set forth in use with pallets, they are also fully capable of use with individual cartons or other load arrangements where the weight of the load is such that it will move by gravity down the inclined path with the slope of the inclined path being adjusted to provide the desired movement characteristics to the pallets and loads or cartons supported on the pallets or on the conveyor chains themselves. The backing rail and side rail 44, 46 and 48 may be rigidly, fixedly or adjustably secured to the supporting frame structure 14 by any suitable attaching arrangement or brackets.

As an alternative to the use of end sprockets 50, 52, they may be eliminated and replaced with a smooth rounded nose formed on or attached to the side rails 48 with the rounded noses forming a trackway for the chain 26 by including retaining flanges or the like. In this arrangement, a centrally located sprocket will engage each chain 26 to drive the speed retarder. However, any suitable arrangement can be used to drive the speed retarder from the conveyor chains to control the speed at which the pallets move down the inclined path.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pallet track for supporting a pallet for movement by gravity along an inclined path under controlled speed conditions comprising a conveyor chain underlying and supportingly engaging a pallet adjacent each side edge thereof, each conveyor chain comprising a plurality of pivotally interconnected components with each component being generally of U-shaped configuration with the bight portions disposed outwardly to define a load supporting surface along the upper flight of the conveyor chain for engagement with the pallet, each U-shaped component including an inwardly extending flange along each edge of the bight portion with each flange terminating in an inner edge, supporting backing rail means supportingly engaging the pivotal components along the upper flight thereof for supporting the components in a substantially straight line position in the upper flight of the conveyor chains, sprocket members at each end of each conveyor chain with the sprocket members being interconnected by a shaft to maintain the conveyor chains at the same speed, and speed retarding means connected with the upper sprocket members to control the rotational speed thereby controlling movement of the conveyor chains and maintaining the upper flight of the conveyor chains in tensioned condition as the pallet drives the conveyor chains during movement down the path, said pivotal components of the conveyor chains being interconnected by a pivot pin extending between the inwardly extending flanges of the U-shaped components adjacent the inner edge thereof, each pivot pin extending transversely and defining an axle, a roller mounted rotatably on the axle between the flanges on each pivotal component and including a periphery which projects inwardly of the inner edges of the flanges on the U-shaped pivotal components for rolling engagement with said backing rail means, each of said sprocket members including a circular plate having a plurality of semi-circular notches therein receiving the periphery of the rollers during movement of the rollers and pivotal components around the end sprocket members thereby positively drivingly connecting the conveyor chains and sprocket members whereby the conveyor chains will drive the sprocket members during movement of the pallets along the inclined path.

2. In combination, a pallet track defining an inclined supporting path, a plurality of pallets supported for movement by gravity along said inclined path under controlled speed conditions, said pallet track comprising a plurality of conveyor cahins underlying and supportingly engaging said pallets, said chains being arranged in pairs with the conveyor chains in each pair being spaced transersely and supporting the pallets adjacent the side edges thereof, said pairs of conveyor chains being aligned longitudinally and inclined to form said inclined path, each conveyor chain comprising a plurality of pivotally interconnected components to define a load supporting surface along the upper flight of the conveyor chain for engagement with the pallets, supporting backing rails supportingly engaging the pivotal components along the upper flight thereof for supporting the components in a substantially straight line position in the upper flight of the conveyor chains, means drivingly by connected with each pair of conveyor chains at the upper end thereof to control the speed of movement of the conveyor chains and maintaining the upper flight of the conveyor chains in tensioned condition as the pallets drive the conveyor chains during movement down the path, said means drivingly connected with the conveyor chains comprising said pivotal components of each conveyor chain being interconnected by a pivot pin extending between inwardly extending flanges of the components adjacent the inner edge thereof, said pivot pin extending transversely and defining an axle, wheel means mounted rotatably on the axle and including a periphery which projects inwardly of the inner edges of the pivotal components for rolling engagement with said backing rail, each conveyor chain being supported by sprocket members at each end thereof with the sprocket members including peripheral notches receiving the periphery of the wheel means for driving interconnection between the conveyor chains and sprocket members, a shaft rigidly interconnecting the sprocket members at the upper end of each pair of conveyor chains and speed retarding means connected with the shaft to control the rotational speed thereby controling the speed of the conveyor chains and the pallet thereon during descent along said inclined path.

* * * * *